(12) United States Patent
Yamashita

(10) Patent No.: US 9,152,805 B2
(45) Date of Patent: Oct. 6, 2015

(54) SECURITY DEVICE

(75) Inventor: Susumu Yamashita, Akiruno (JP)

(73) Assignee: SOCIONEXT INC., Yokohama (JP)

( * ) Notice: Subject to any disclaimer, the term of this patent is extended or adjusted under 35 U.S.C. 154(b) by 495 days.

(21) Appl. No.: 13/484,831

(22) Filed: May 31, 2012

(65) Prior Publication Data

US 2013/0016832 A1 Jan. 17, 2013

(30) Foreign Application Priority Data

Jul. 15, 2011 (JP) ................................ 2011-156722

(51) Int. Cl.
| | |
|---|---|
| *G06F 21/00* | (2013.01) |
| *H04L 29/06* | (2006.01) |
| *G06F 21/60* | (2013.01) |
| *G06F 21/72* | (2013.01) |
| *H04L 9/06* | (2006.01) |
| *H04L 9/32* | (2006.01) |

(52) U.S. Cl.
CPC .............. *G06F 21/606* (2013.01); *G06F 21/72* (2013.01); *H04L 9/0656* (2013.01); *H04L 9/3271* (2013.01); *G06F 2221/2107* (2013.01)

(58) Field of Classification Search
CPC  G06F 21/606; G06F 21/72; G06F 2221/2107
See application file for complete search history.

(56) References Cited

U.S. PATENT DOCUMENTS

| | | | | |
|---|---|---|---|---|
| 5,541,993 | A * | 7/1996 | Fan et al. ...................... | 380/243 |
| 6,460,137 | B1 | 10/2002 | Akiyama et al. | |
| 2002/0138850 | A1* | 9/2002 | Basil et al. ..................... | 725/117 |
| 2002/0154779 | A1* | 10/2002 | Asano et al. ................... | 380/277 |
| 2003/0163719 | A1* | 8/2003 | Ebihara ......................... | 713/193 |
| 2005/0210275 | A1* | 9/2005 | Homing et al. ................ | 713/190 |
| 2007/0016534 | A1* | 1/2007 | Harrison et al. ................ | 705/65 |
| 2008/0090653 | A1* | 4/2008 | Kuehling et al. ............... | 463/29 |
| 2008/0168279 | A1 | 7/2008 | Kanai | |

(Continued)

FOREIGN PATENT DOCUMENTS

| | | |
|---|---|---|
| CN | 101022455 | 8/2007 |
| CN | 101197660 | 6/2008 |

(Continued)

OTHER PUBLICATIONS

Japanese Office Action dated Dec. 2, 2014 in corresponding Japanese Patent Application No. 2011-156722.

(Continued)

*Primary Examiner* — Lisa Lewis
(74) *Attorney, Agent, or Firm* — Staas & Halsey LLP

(57) ABSTRACT

A security device connected to a host device which includes a processor performing a scramble operation and a storage unit, the security device comprising: a storage unit in which the first authentication code is stored; a random number generation unit; an encryption unit; and a controller which performs a scramble operation, wherein the controller generates a first scramble key by performing the scramble operation on the random number and the first authentication code and transmits the first scramble key to the host device, and the controller receives, from the host device, scramble data generated by performing the scramble operation on encryption target data according to the random number, generates the encryption target data by performing the scramble operation on the scramble data and the random number, generates encryption data, and transmits the encrypted data to the host device.

10 Claims, 10 Drawing Sheets

(56) References Cited

U.S. PATENT DOCUMENTS

| | | | |
|---|---|---|---|
| 2008/0209231 A1* | 8/2008 | Kim et al. | 713/189 |
| 2012/0185699 A1* | 7/2012 | Arnold | 713/189 |
| 2014/0189358 A1* | 7/2014 | Grimen et al. | 713/171 |
| 2014/0195882 A1* | 7/2014 | Asterjadhi et al. | 714/807 |

FOREIGN PATENT DOCUMENTS

| | | | |
|---|---|---|---|
| DE | 102012209249 A1 * | 1/2013 | |
| EP | 2026494 | 2/2009 | |
| JP | 8-335040 | 12/1996 | |
| JP | 10-222468 * | 8/1998 | |
| JP | 2006-277411 | 10/2006 | |
| JP | 2007-006506 | 12/2007 | |
| JP | 2007-336506 | 12/2007 | |
| JP | 2010-16526 | 1/2010 | |

OTHER PUBLICATIONS

Eiji Okamoto, "Cipher technique 1 going toward a realization of a brighter information society Menace and Countermeasure for information", Japan, Kyouritu Publication Limited, Jul. 1, 1991, vol. 23, No. 8, pp. 60-66.

Chinese Office Action issued Oct. 10, 2014 in corresponding Chinese Patent Application No. 201210229682.4.

Office Action mailed Apr. 28, 2015 for corresponding Chinese Patent Application No. 201210229682.4.

* cited by examiner

SECURITY DEVICE

CROSS-REFERENCE TO RELATED APPLICATION

This application is based upon and claims the benefit of priority of the prior Japanese Patent Application No. 2011-156722, filed on Jul. 15, 2011, the entire contents of which are incorporated herein by reference.

FIELD

Embodiments discussed herein relate to a security device.

BACKGROUND

Information leakage by a theft of data stored in a built-in storage (external storage device) and of data that flows over wirings of a circuit board is increasing lately, and demand for adding security functions is increasing. To meet this demand, one possible means is adding a security chip (security device) having a data encryption function to the current system of the built-in units. Then data stored in such a storage as a microprocessor from a host chip (host device) on the circuit board, and data that flows through the circuit board can be encrypted by the security chip, and information leakage can be prevented.

In the case of a security chip encrypting data that is processed by a host chip, on the other hand, the encryption target data is transferred from the host chip to the security chip via wirings. In other words, unencrypted data flows over wirings between the host chip and the security chip. Therefore a new concern regarding information leakage is theft of unencrypted data that flows between the host chip and the security chip.

SSL/TLS and a stream cipher method, for example, have been used to encrypt data. In the case of SSL/TLS, the server sends a public key to the client, and the client encrypts a random number based on the received public key (e.g. RSA, DH), and sends the encrypted random number to the server. The server obtains the random number by decrypting the encrypted random number using a secret key which forms a pair with the public key. Thus both parties share a random number, and generate a common key according to a common encryption algorithm (e.g. AES, DES) based on the shared random number, and encrypts the data based on the common key before transmitting/receiving data.

In the case of a stream cipher method, the transmission side (e.g. client) and the reception side (e.g. server) share a counter sequence and a common key, and generate a common stream cipher key sequence (random number sequence) respectively using block ciphers (e.g. AES, DES) respectively. The transmission side generates scrambled data by performing the exclusive OR (XOR/EOR) operation on the transmission target data and stream cipher key string, and transmits the result to the reception side, and the reception side decrypts the original data by performing the exclusive OR (XOR/EOR) operation on the received scrambled data and the stream cipher key string.

Japanese Patent Application Laid-Open Publication No. 2007-336506 and No. H10-222468 disclose an example of encryption technology.

SUMMARY

In order to use conventional encryption technology, however, both the server (reception side) and the client (transmission side) must have encryption means (e.g. RSA, AES). For example, both the server and the client must have encryption mean when a random number, to be the source of the common key, and the common key, are generated in the case of SSL/TLS, and when the stream cipher key sequence is generated in the case of a stream encryption method.

This means that according to conventional encryption technology, the encryption means must be installed on the host chip as well, in order to encrypt data between the host chip and the security chip. Therefore the initial object, that is to enable encryption of data in the host chip simply by installing the security chip on the current host chip, cannot be implemented. Furthermore the load of encryption processing is high, and installing the encryption means on the host chip increases the load on the entire system.

In accordance with an embodiment, a security device connected to a host device which includes a processor performing a scramble operation and a storage unit in which a first authentication code is stored, the security device comprising: a storage unit in which the first authentication code is stored; a random number generation unit which generates a random number; an encryption unit which encrypts or decrypts data; and a controller which performs a scramble operation, wherein the controller generates a first scramble key by performing the scramble operation on the random number generated by the random number generation unit and the first authentication code and transmits the first scramble key to the host device, and the controller receives, from the host device, scramble data generated by performing the scramble operation on encryption target data according to the random number obtained from the first scramble key, generates the encryption target data by performing the scramble operation on the scramble data and the random number, generates encryption data by encrypting the encryption target data by the encryption unit, and transmits the encrypted data to the host device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments will be described hereinafter according to the drawings. However, it is noted that the technical scope is not limited to the embodiments described below, but covers the matters described in the claims and the equivalents thereof.

Figure 1:
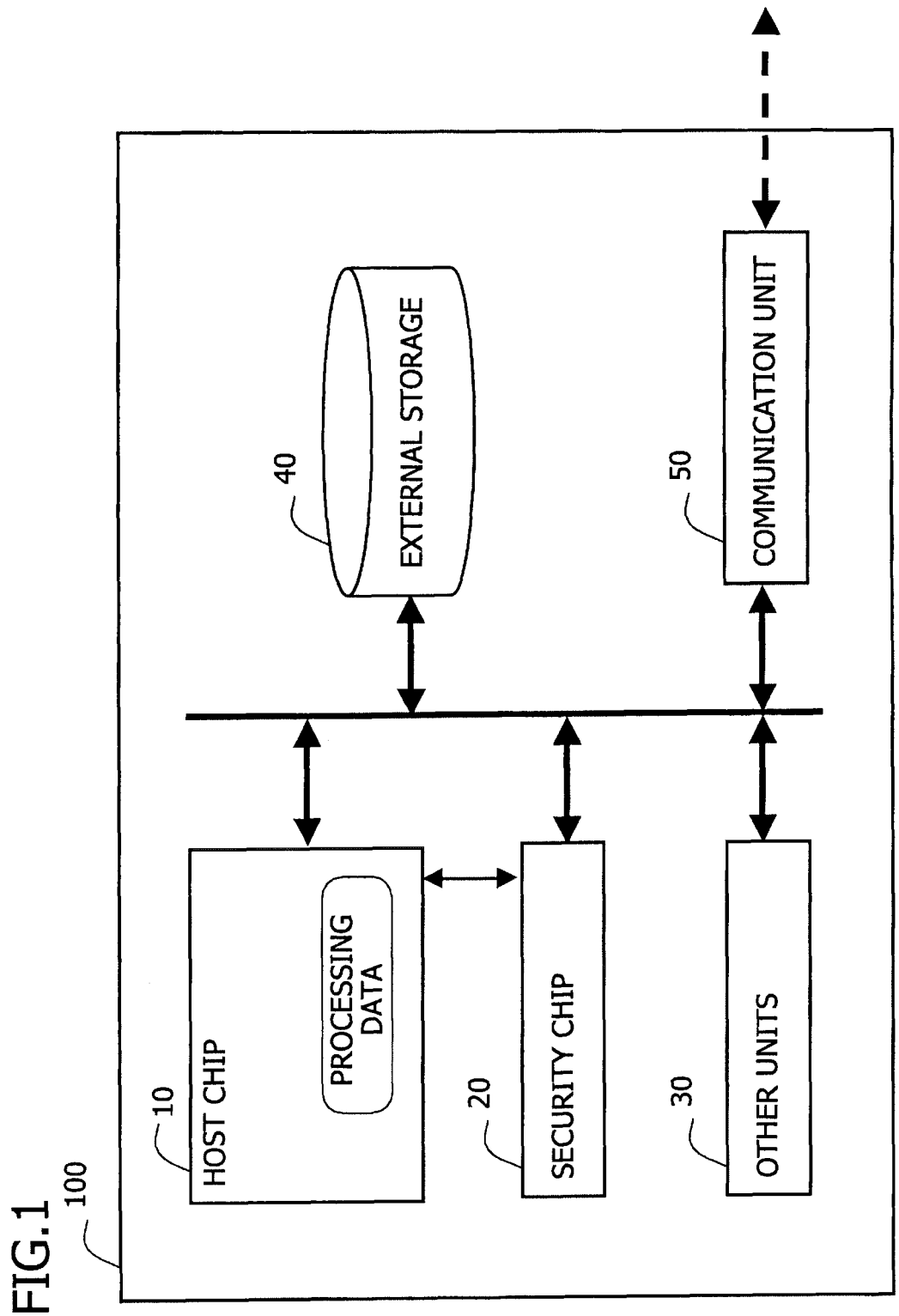
FIG. 1 is a diagram depicting an example of a semiconductor device 100 built-in a system according to this embodiment.

FIG. 1 is a diagram depicting an example of a semiconductor device 100 built-in a system according to this embodiment. The semiconductor device 100 in FIG. 1 includes a host chip 10, a security chip 20, other units 30, an external storage 40 and a communication unit 50, and these components are connected via a bus line. The security chip 20 is connected with a host chip 10 via a bus line or serial line, and performs encryption processing or decryption processing on data transferred from the host chip 10, using RSA or AES, for example.

For example, data processed by the host chip 10 is transferred to the security chip 20, converted into encrypted data, and then transferred to the external storage 40, the communication unit 50 and other units 30. Encrypted data received from an external apparatus via the communication unit 50 and the encrypted data stored in the external storage 40 are transferred to the security chip 20, decrypted into original data, and then transferred and processed to the host chip 10.

Figure 2:
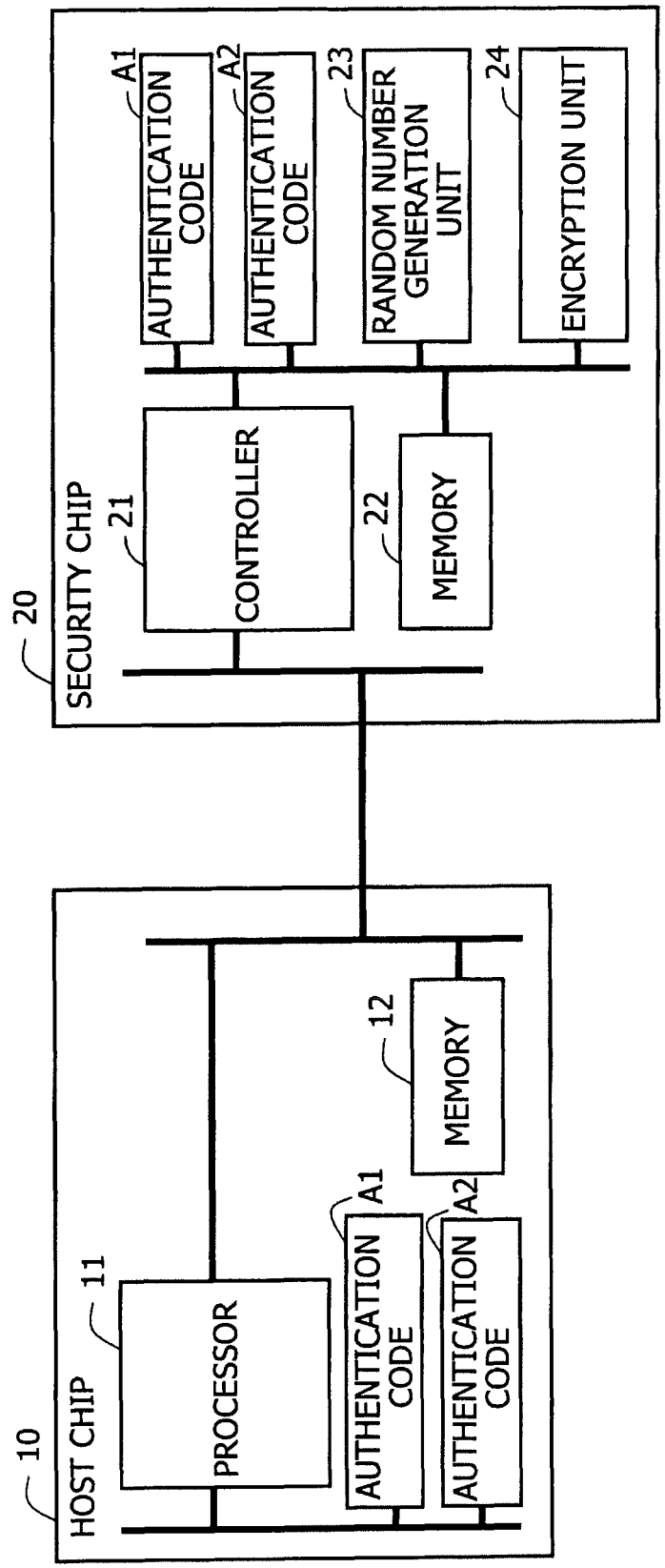
FIG. 2 is a diagram depicting an example of the configurations of the host chip 10 and the security chip 20 according to this embodiment.

FIG. 2 is a diagram depicting an example of the configurations of the host chip 10 and the security chip 20 according to this embodiment. The host chip 10 according to this embodiment has, for example, a processor 11, an authentication code A1, an authentication code A2 and a memory 12 used for processing by the processor 11. The security chip 20 has, for example, a controller 21, a memory 22, an authentication code A1, an authentication code A2, a random number generation unit 23 and an encryption unit 24. The random number generation unit 23 of the security chip 20 generates a true random number or a pseudo-random number, and the encryption unit 24 of the security chip 20 performs advanced encryption processing and decryption processing on data.

The processor 11 of the host chip 10 and the controller 21 of the security chip 20 in FIG. 2 have operation functions, such as arithmetical operation and logical operation. The host chip 10 and the security chip 20 share the authentication codes A1 and A2. The authentication codes A1 and A2 are numerical values of about 16 digits, and may be input from an external apparatus.

Now the processing of a first embodiment will be described first. The authentication code A2 is not used for the first and second embodiments, but is used only for the third embodiment.

[First Embodiment]

Figure 3:
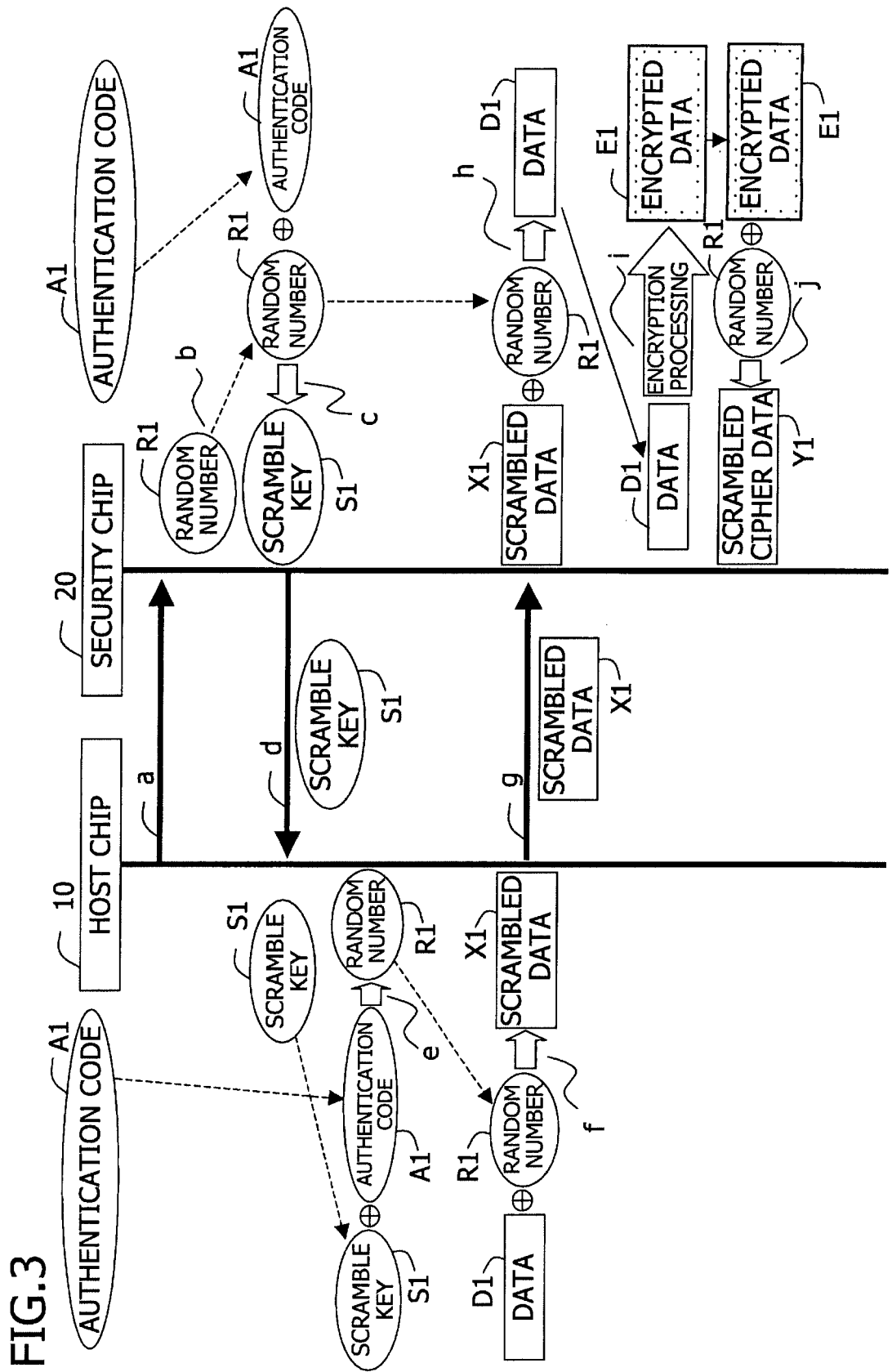
FIG. 3 is diagram depicting an example of processing between the host chip 10 and the security chip 20 according to the first embodiment.
Figure 4:
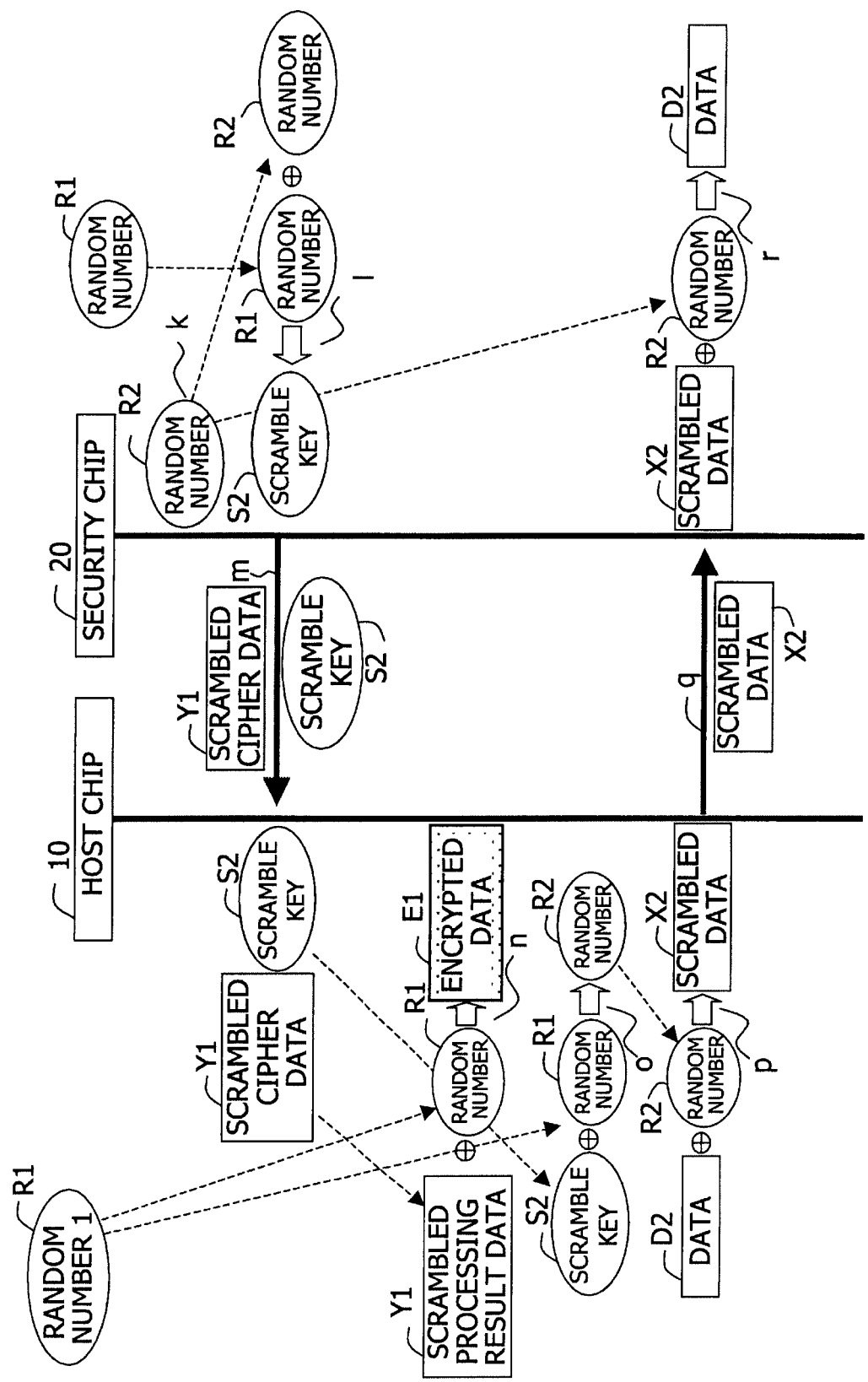
FIG. 4 is diagram depicting an example of processing between the host chip 10 and the security chip 20 according to the first embodiment.

FIG. 3 and FIG. 4 are diagrams depicting an example of processing between the host chip 10 and the security chip 20 according to the first embodiment. FIG. 3 and FIG. 4 depict scrambling of data in the case when unencrypted data is transmitted from the host chip 10 to the security chip 20. In concrete terms, the unencrypted data is scrambled and transmitted from the host chip 10 to the security chip 20, the security chip 20 restores the data in the scrambled state, and obtains the unencrypted data. The security chip 20 encrypts the unencrypted data, further scrambles the data, and transmits the scrambled cipher data to the host chip 10. In this embodiment, the host chip 10 and the security chip 20 hold a same authentication code A1.

The scramble operation for data will be described first. According to this embodiment, the exclusive OR (hereafter XOR) operation is used for the scramble operation. The XOR operation is included in the basic processing functions of the processor 11 of the host chip 10 and the controller 21 of the security chip 20. In the scramble operation based on the XOR operation, a value of the target data is scrambled according to a value to be a key. In concrete terms, the target value A is scrambled by determining the XOR with a value X, which is the key, and a value B is generated as a result. The value A is restored by determining the XOR of the value B and the value X. In other words, the scramble data (value B) generated by the XOR operation of the data (value A) and the key (value X) is restored to the original data (value A) by the XOR operation of the generated scramble data (value B) and the key (value X).

In the case of scrambling based on the XOR operation, the key is required to restore the original data from the scramble data. Since a third party does not know the key, the third party cannot restore the original data based on the scrambled data. The scramble operation is not limited to the XOR operation. As long as the original data can be restored, the scramble operation may be performed by other operations, such as an arithmetical operation, or by a combination of an XOR operation and an arithmetical operation.

Referring to FIG. 3 again, the host chip 10 at first issues an initialization command to notify the security chip 20 of the start of processing (a). When the initialization command is received, the security chip 20 generates a random number R1 using the random number generation unit 23 (b). Then the random number generation unit 23 of the security chip 20 generates a scramble key S1 by performing the XOR operation on the random number R1 and the authentication code A1 (c). Then the security chip 20 transmits the generated scramble key S1, along with the result of the initialization processing, to the host chip 10 (d).

When the scramble key S1 is received, the host chip 10 obtains the random number R1 by performing the XOR operation on the scramble key S1 according to the authentication code A1, which is held in advance (e). Thereby the host chip 10 and the security chip 20 share the random number R1 as well as the authentication code A1. The host chip 10 generates scrambled data X1 by performing the XOR operation on encryption target data D1 and the shared random number R1 (f), and transmits the scrambled data X1, along with the encryption instruction, to the security chip 20 (g).

When the encryption instruction and the scrambled data X1 are received, the security chip 20 obtains the data D1 by performing the XOR operation on the scrambled data X1 according to the random number R1 (h). Then the encryption unit 24 of the security chip 20 generates encrypted data E1 by performing the encryption processing on the data D1 (i). Then the security chip 20 generates scrambled cipher data Y1 by performing the XOR operation on the encrypted data E1 and the random number R1 (j).

Then as FIG. 4 depicts, the security chip 20 generates a random number R2, which is a new random number for the next scrambling (k). Then the security chip 20 generates a scramble key S2 by performing the XOR operation on the generated random number R2 and the random number R1 (l). Then the security chip 20 transmits the scramble key S2, along with the scrambled cipher data Y1 generated in the processing j in FIG. 3, to the host chip 10 (m).

When the scrambled cipher data Y1 and the scramble key S2 are received, the host chip 10 obtains the encrypted data E1 by performing the XOR operation on the scrambled cipher data Y1 according to the random number R1 (n). The host chip 10 also obtains the random number R2 by performing the XOR operation on the received scramble key S2 according to the random number R1 (o). Thereby the host chip 10 can obtain the encrypted data E1 corresponding to the encryption target data D1, and the new random number R2 is shared by the host chip 10 and the security chip 20.

If the next encryption target data D2 still exists, the host chip 10 generates scrambled data X2 by performing the XOR operation on the encryption target data D2 and a new random number R2 (p), and transmits the scrambled data X2 to the security chip 20 (q). The security chip 20 obtains the encryption target data D2 by performing the XOR operation on the received scrambled data X2 according to the random number R2 (r). Just like the previous encryption target data D1, the encryption unit 24 converts the data D2 into the encrypted data E2. Then the scrambled cipher data Y2 is generated by the XOR operation performed on the encrypted data E2 and the random number R2. Then the security chip 20 generates a random number R3 (not illustrated) which is a new random number for scrambling, and transmits the random number R3, along with the scrambled cipher data Y2, to the host chip 10.

Thus the security chip 20 prevents leakage of data to be transmitted/received, by scrambling data according to the random number shared by the host chip 10 and the security chip 20 before transmitting/receiving the data. The random number is changed every time a predetermined number of transmission/reception sessions are performed, and the data is scrambled according to the random number of the previous session (authentication code A1 in the case of the first session), and transmitted to the host chip 10, and the host chip 10 restores the scrambled data according to this random number so as to share this data.

The example in FIG. 3 and FIG. 4 is a case of transmitting encryption target data (unencrypted data) from the host chip 10 to the security chip 20. Now a case of transmitting decryption target data (encrypted data) from the host chip 10 to the security chip 20 will be described.

Figure 5:
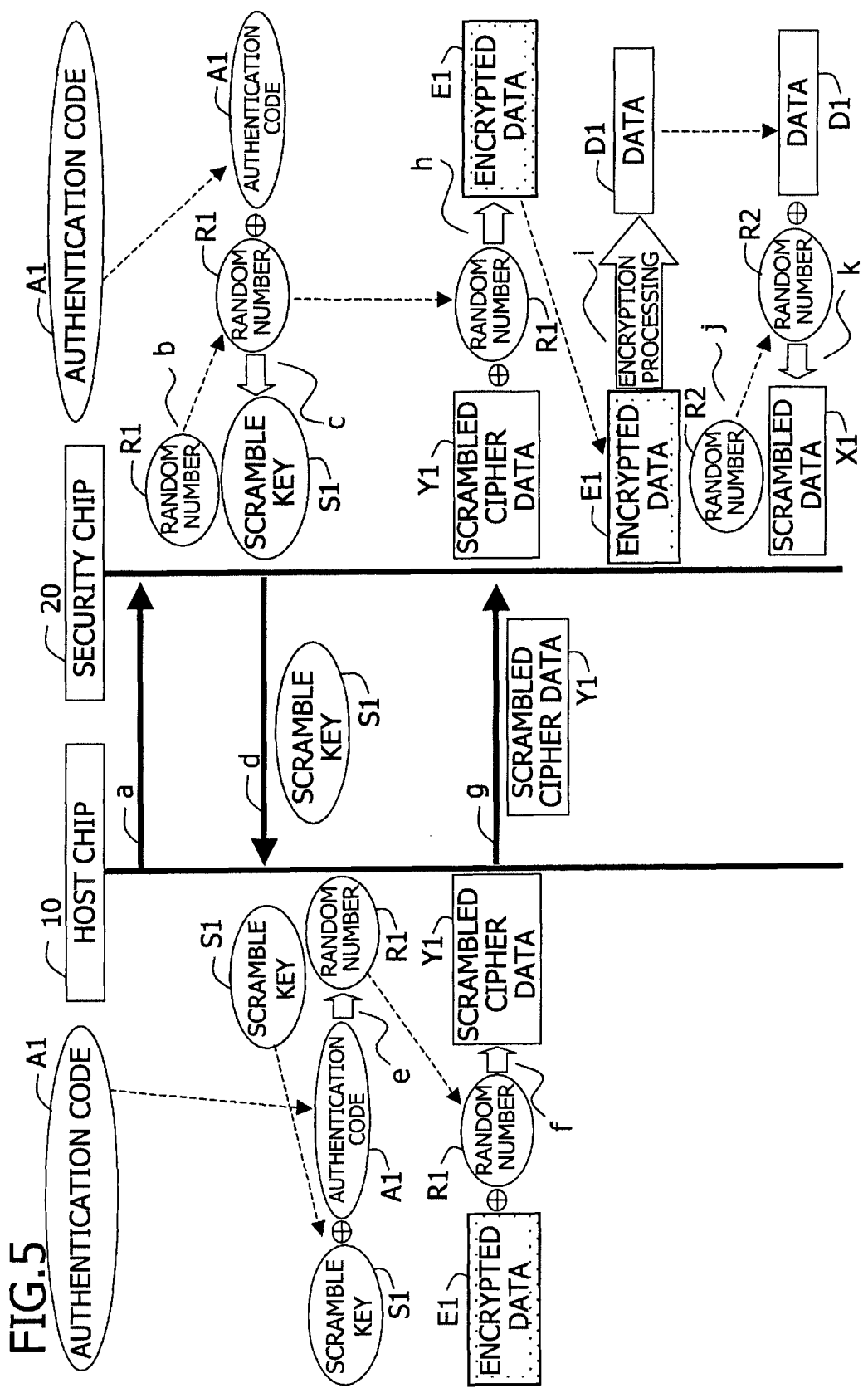
FIG. 5 is diagram depicting scrambling of data in the case when encrypted data is transmitted from the host chip 10 to the security chip 20, and is decrypted by the encryption unit 24 of the security chip 20.
Figure 6:
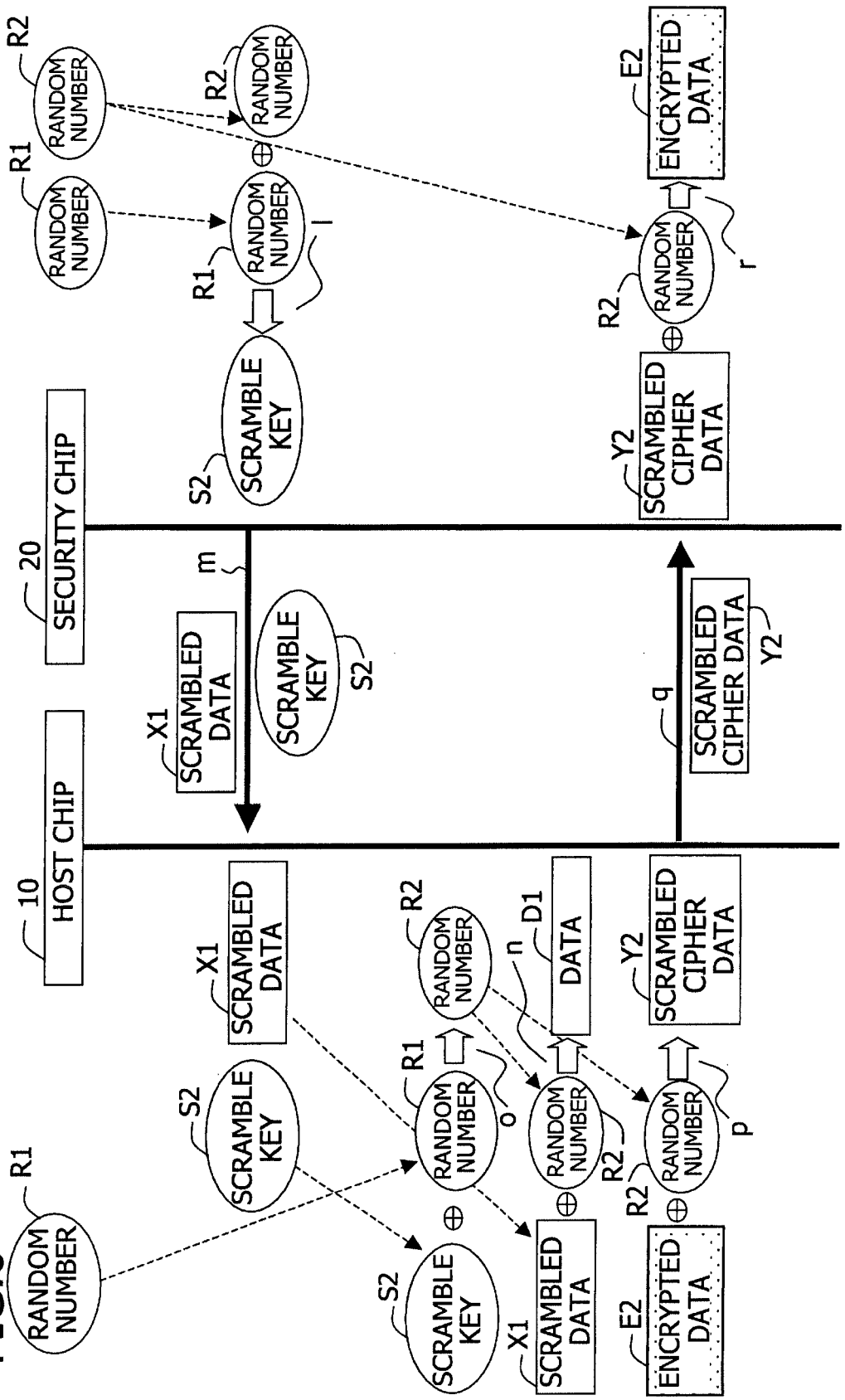
FIG. 6 is diagram depicting scrambling of data in the case when encrypted data is transmitted from the host chip 10 to the security chip 20, and is decrypted by the encryption unit 24 of the security chip 20.

FIG. 5 and FIG. 6 are diagrams depicting scrambling of data in the case when encrypted data is transmitted from the host chip 10 to the security chip 20, and is decrypted by the encryption unit 24 of the security chip 20. Just like FIG. 3 and FIG. 4, the host chip 10 and the security chip 20 hold a same authentication code A1.

In FIG. 5, the host chip 10 and the security chip 20 share a random number R1 as described in FIG. 3, and the host chip 10 generates scrambled cipher data Y1 by performing the XOR operation on encrypted data E1 and the random number R1 (f), and transmits the scrambled cipher data Y1, along with a decryption instruction, to the security chip 20 (g). The security chip 20 obtains the encrypted data E1 by performing the XOR operation on the received scrambled cipher data Y1 according to the random number R1 (h). Then the encryption unit 24 of the security chip 20 generates data D1 by decrypting the encrypted data E1.

Then before the scramble processing of the data D1, the security chip 20 generates a new random number R2 (j). The security chip 20 generates scrambled data X1 by performing the XOR operation on the newly generated random number R2, not on the random number R1 (as in the case of FIG. 3), and the data D1 (k). Unencrypted data (D1 in this example) has a higher risk of leakage when data is restored from the scrambled state, compared with the encrypted data (E1 in this example). Therefore the security chip scrambles the unencrypted data according to the random number R2, which is newly generated and is used for the first time, not the random number R1 which has been used for scrambling before. This makes it more difficult to restore the unencrypted data. The present embodiment, however, is not limited to this example, but the security chip 20 may scramble the unencrypted data D1 according to the random number R1, instead of the random number R2 in the processing k.

As FIG. 6 depicts, the security chip 20 generates a scramble key S2 by performing the XOR operation on the random number 1 and the random number 2 (l), and transmits the scramble key S2, along with the scrambled data X1, to the host chip 10 (m). The host chip 10 obtains the random number R2 by performing the XOR operation according to the random number R1 (o). Then the host chip 10 obtains the data D1 by performing the XOR operation on the scrambled data X1 according to the random number R2 (n). Thereby the data D1, which is decrypted data of the encrypted data E1, is obtained by the host chip 10, and the random number R2 is shared by the host chip 10 and the security chip 20. If the next encryption data E2 to be decrypted still exists, the host chip 10 generates scrambled cipher data Y2 by performing the XOR operation on the encrypted data E2 and the random number R2 (p). Subsequent processing is the same as the processing g to processing n in FIG. 5 and FIG. 6.

Thus to encrypt data, the security chip (security device) 20 according to this embodiment generates a scramble key by performing the scramble operation on a random number generated by the random number generation unit 23 and an authentication code, and transmits the scramble key to the host chip (host device) 10. The security chip 20 receives, from the host chip 10, scramble data generated by performing the scramble operation on the encryption target data according to the random number obtained from the scramble key. The security chip 20 generates the encryption target data by performing the scramble operation on the scramble data and the random number, generates the encrypted data by encrypting the encryption target data using the encryption unit 24, and transmits the encrypted data to the host chip 10.

To decrypt data, on the other hand, the security chip 20 according to this embodiment generates a scramble key by performing the scramble operation on a random number generated by the random number generation unit 23 and an authentication code, and transmits the scramble key to the host chip 10. The security chip 20 also generates decrypted data by decrypting the encrypted data using the encryption unit 24, generates scramble data by performing the scramble operation on the decrypted data and the random number, and transmits the scramble data to the host chip 10. Then the security chip 20 obtains the decrypted data from the scramble data by causing the processor 11 of the host chip 10 to perform the scramble operation on the scramble data according to the random number obtained from the scramble key.

In the host chip 10, a random number is obtained by performing the scramble operation on the scramble key according to the authentication code for the first time and according to the random number of the previous session for each of the second or later transmission/reception sessions. In each of the second or later transmission/reception sessions, the security chip 20 generates a scramble key by performing the scramble operation on the random number of the current transmission/reception session and the random number of the previous transmission/reception session, and transmits the scramble key to the host chip 10. The host chip 10 obtains the random number of the current transmission/reception session by performing the scramble operation on the transmitted scramble key according to the random number of the previous transmission/reception session.

Thus the security chip 20 according to this embodiment can prevent leakage of data by scrambling the data exchanged with the host chip 10 before transmission/reception, without the host chip 10 requiring an encryption unit 24 which performs advanced encryption processing. Since the security chip 20 does not use advanced encryption processing for scrambling the data, load on the system can be suppressed, and a drop in communication speed due to scrambling can be prevented.

Data is scrambled according to a random number shared between the host chip 10 and the security chip 20. Therefore even if a third party recognizes that the scramble data was scrambled according to a random number, the scrambled data cannot be restored since the third party does not know the value of the random number. This random number is scrambled by the security chip 20 according to the previous random number (or authentication code if it is the first session) and transmitted to the host chip 10, and the host chip 10 shares the random number by restoring the scrambled random number according to the previous random number (or authentication code if it is the first session). Hence even if a third party obtains a scramble key, the value of the random number cannot be restored from the scramble key unless the previous random number (or authentication code if it is the first session) is detected. Thus the security chip 20 according to this embodiment makes it difficult to restore data based on the scrambled data even if the third party recognizes the scramble procedure of the data.

According to the security chip 20 of this embodiment, it is sufficient if only the security chip 20 has the random number generation unit 23 for generating a random number, and the host chip 10 need not have the random number generation unit 23. In other words, it is sufficient that the host chip 10 according to this embodiment has an authentication code in the memory 12 in addition to the operation functions provided in advance, and need not have the encryption unit 24 and the random generation unit 23. Therefore the data between the host chip 10 and the security chip 20 can be scrambled, and data leakage can be prevented only if the security chip 20 of this embodiment is mounted on the circuit board of the conventional system having the host chip 10.

In this embodiment, a random number used for scrambling data is changed every time a predetermined number of transmission/reception sessions is performed. Therefore even if a third party analyzes a random number, the random number for scrambling data is changed after a predetermined number of sessions is performed. Hence the security chip 20 of this embodiment makes it difficult for the scramble data to be continuously analyzed, so that the data leakage range can be minimized. In this embodiment, the random number is changed every time the transmission/reception session is performed, but the frequency of changing the random number is not limited to this. The frequency of changing the random number may be every time a plurality of times of transmission/reception sessions is performed, or may be every time a transmission or reception processing is performed.

In this embodiment, the encrypted datum E1 and E2 also become a target of scrambling. However, in the case of encrypted data, the risk of leakage of data content is low even if the data is restored from the scrambled state, because the data is encrypted. Therefore the encrypted data need not always be a target of scrambling, and at least an encrypted data, of which risk is high if the data is restored, can be the target of scrambling.

The security chip 20 according to this embodiment changes a random number every time a predetermined number of transmission/reception sessions are performed, but does not change an authentication code. In the security chip 20 and the host chip 10, a random number which is temporarily generated and used is stored in such a memory as RAM, and an authentication code is stored in such a memory as a non-volatile memory, for example. In the case of a non-volatile memory, error and data corruption may occur when updating data if power supply is unstable or if a number of times of writing has a limit.

But an authentication code is not changed in the security chip 20 according to this embodiment, so there is no need to be concerned with corruption or loss of an authentication code during updating of the non-volatile memory, which is required when an authentication code is changed. Even if a random number stored in RAM or the like is lost due to power supply instability, the security chip 20 can restart the scramble processing of data according to an authentication code and a newly generated random number responding to a new initialization command (a in FIG. 3 and FIG. 5).

[Second Embodiment]

A security chip 20 according to a second embodiment scrambles a random number, not according to the random number of the previous session but according to an authentication code, in the scramble processing when a newly generated random number is shared with the host chip. This processing will be described with reference to the drawings.

Figure 7:
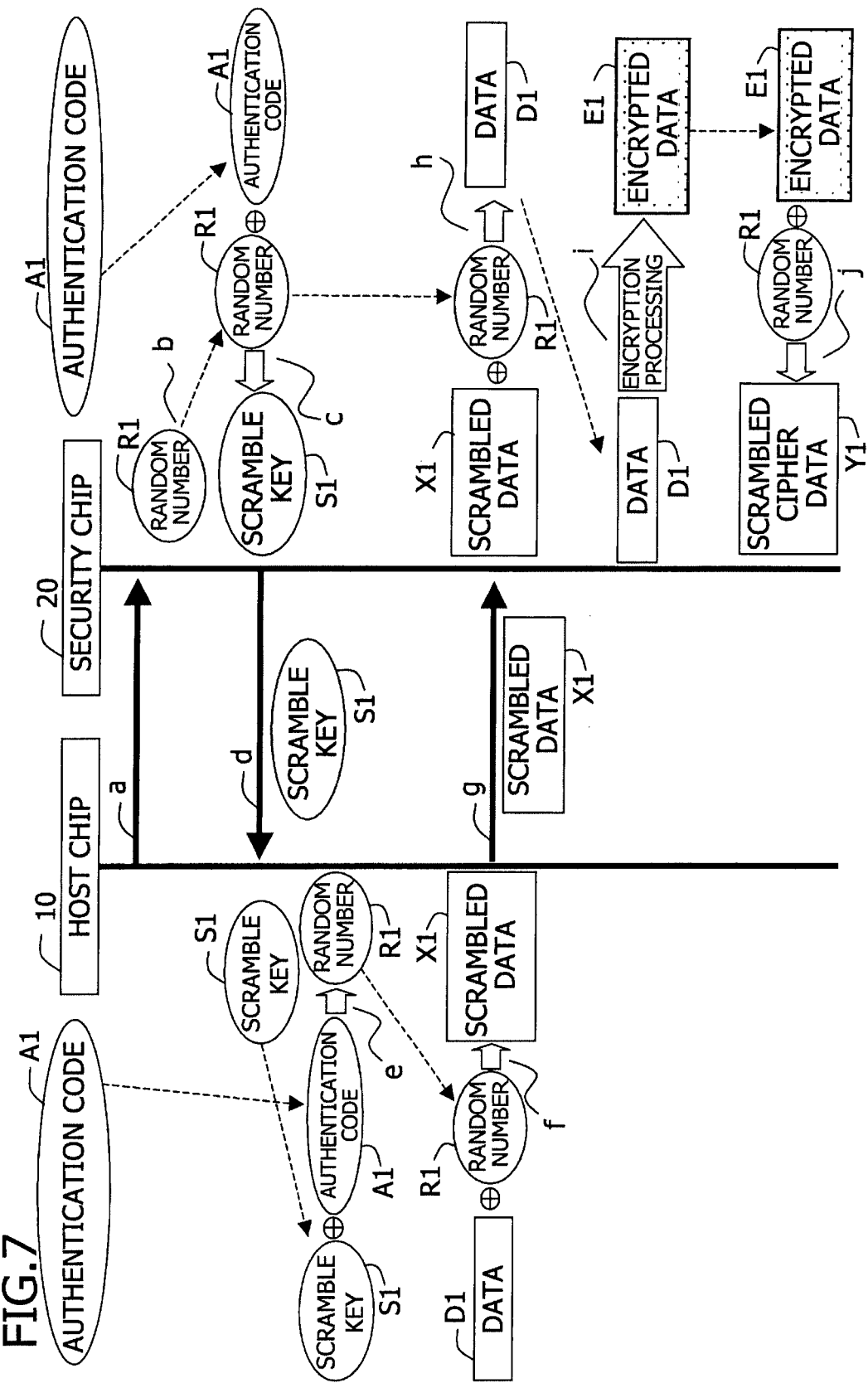
FIG. 7 is diagram depicting an example of processing between a host chip 10 and a security chip 20 according to the second embodiment.
Figure 8:
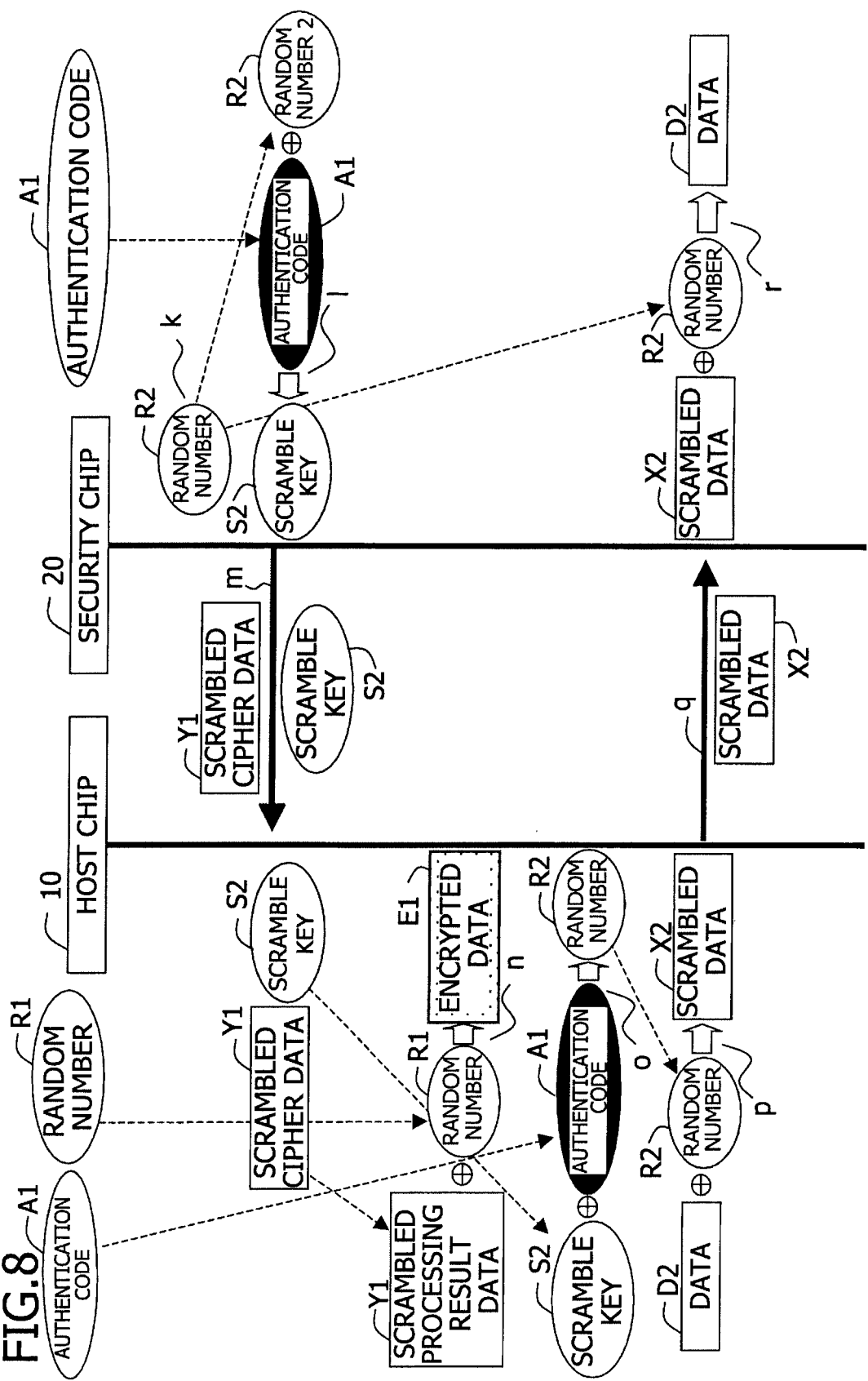
FIG. 8 is diagram depicting an example of processing between a host chip 10 and a security chip 20 according to the second embodiment.

FIG. 7 and FIG. 8 are diagrams depicting an example of processing between a host chip 10 and a security chip 20 according to the second embodiment. Just like FIG. 3 and FIG. 4, FIG. 7 and FIG. 8 depict the scrambling of data in the case when unencrypted data is transmitted from the host chip 10 to the security chip 20. Just like the first embodiment, the host chip 10 and the security chip 20 hold a same authentication code A1.

The processing in FIG. 7 is the same as the processing in FIG. 3 according to the first embodiment. The host chip 10 and the security chip 20 share a random number R1, and the host chip 10 generates scrambled data X1 by scrambling encryption target data D1, and transmits the scrambled data X1 to the security chip 20 (g). The security chip 20 obtains the encryption target data D1 from the scrambled data X1 and encrypts the data D1. The encrypted data E1 is scrambled according to the random number R1 (j).

Then as FIG. 8 depicts, the security chip 20 generates a random number R2, which is a new random number for the next scrambling, and scrambles the random number R2 (l). In this embodiment, the security chip 20 generates a scramble key S2 by performing the XOR operation on the generated random number R2 according to an authentication code A1, instead of the random number R1. The scramble key S2, along with scrambled cipher data Y1, is transmitted to the host chip 10 (m).

Then the host chip 10 obtains the encrypted data E1 by performing the XOR operation on the scrambled cipher data Y1 according to the random number R1 (n), and obtains the random number R2 by performing the XOR operation on the scramble key S2 according to the authentication code A1, instead of the random number R1 (o). Thereby the host chip 10 obtains encrypted data E1 of the encryption target data D1, and the random number R2 is shared between the host chip 10 and the security chip 20. Subsequent processing is the same as processing p to processing r in FIG. 4.

The example in FIG. 7 and FIG. 8 is a case of transmitting encryption target data from the host chip 10 to the security chip 20, but a case of transmitting decryption target data from the host chip 10 to the security chip 20 is also the same. In this case as well, a new random number generated by the security chip 20 is scrambled according to the authentication code A1, and is transmitted to the host chip 10, and the host chip 10 shares the new random number by restoring the scrambled random number according to the authentication code A1. The data decrypted by the security chip 20 is scrambled according to the random number, and is transmitted to the host chip 10, and the host chip 10 restores the scrambled data by performing scramble operation according to the random number.

Thus to encrypt data, the security chip 20 according to this embodiment generates the scramble key by performing the scramble operation on the random number generated by the random number generation unit 23 and the authentication code, and transmits the scramble key to the host chip 10. The security chip 20 receives, from the host chip 10, the scramble data generated by performing the scramble operation on the encryption target data according to the random number obtained from the scramble key. The security chip 20 generates the encryption target data by performing the scramble operation on the scramble data and the random number, generates the encrypted data by encrypting the encryption target data using the encryption unit 24, and transmits the encrypted data to the host chip 10.

To decrypt data, on the other hand, the security chip 20 according to this embodiment generates the scramble key by performing the scramble operation on the random number generated by the random number generation unit 23 and the authentication code, and transmits the scramble key to the host chip 10. The security chip 20 also generates decrypted data by decrypting the encrypted data using the encryption unit 24, generates the scramble data by performing the scramble operation on the decrypted data and the random number, and transmits the scramble data to the host chip 10. Then the security chip 20 obtains the decrypted data from the scramble data by causing the processor 11 of the host chip 10 to perform the scramble operation on the scramble data according to the random number obtained from the scramble key.

In the host chip 10, a random number is obtained by performing the scramble operation on the scramble key according to the authentication code.

Thus the security chip 20 according to this embodiment can prevent leakage of data by scrambling the data exchanged with the host chip 10 before transmission/reception, without the host chip 10 requiring an encryption unit 24. Since the security chip 20 does not use advanced encryption processing for scrambling the data, load on the system can be suppressed, and a drop in communication speed due to scrambling can be prevented.

Data is scrambled according to a random number shared between the host chip 10 and the security chip 20. Therefore even if a third party recognizes that the scramble data was scrambled according to a random number, the scrambled data cannot be restored, since the third party does not know the value of the random number. This random number is scrambled by the security chip 20 according to the authentication code A1, and is transmitted to the host chip 10, and the host chip 10 shares the random number by restoring the scrambled random number according to the authentication code A1. Hence even if a third party obtains a scramble key, the value of the random number cannot be restored from the scramble key unless the authentication code A1 is detected. Thus the security chip 20 according to this embodiment makes it difficult to restore data based on the scrambled data, even if the third party recognizes the scramble procedure.

According to the security chip 20 of this embodiment, it is sufficient if only the security chip 20 has the random number generation unit 23 for generating a random number, and the host chip 10 need not have the random number generation unit 23. Therefore data between the host chip 10 and the security chip 20 can be scrambled, and data leakage can be prevented only if the security chip 20 of this embodiment is mounted on the circuit board of the conventional system having the host chip 10.

Furthermore a random number used for scrambling data is changed every time a predetermined number of transmission/reception session is performed. Hence the security chip 20 of this embodiment makes it difficult for the scramble data to be continuously analyzed so that the data leakage range can be minimized.

[Third Embodiment]

A security chip 20 according to a third embodiment has two authentication codes (hereafter called "first authentication code" and "second authentication code"). The first authentication code is used for scrambling to share a newly generated random number with the host chip, just like the second embodiment. The second authentication code is used for generating a second scramble key which is used for scrambling data. This processing will be described with reference to the drawings.

Figure 9:
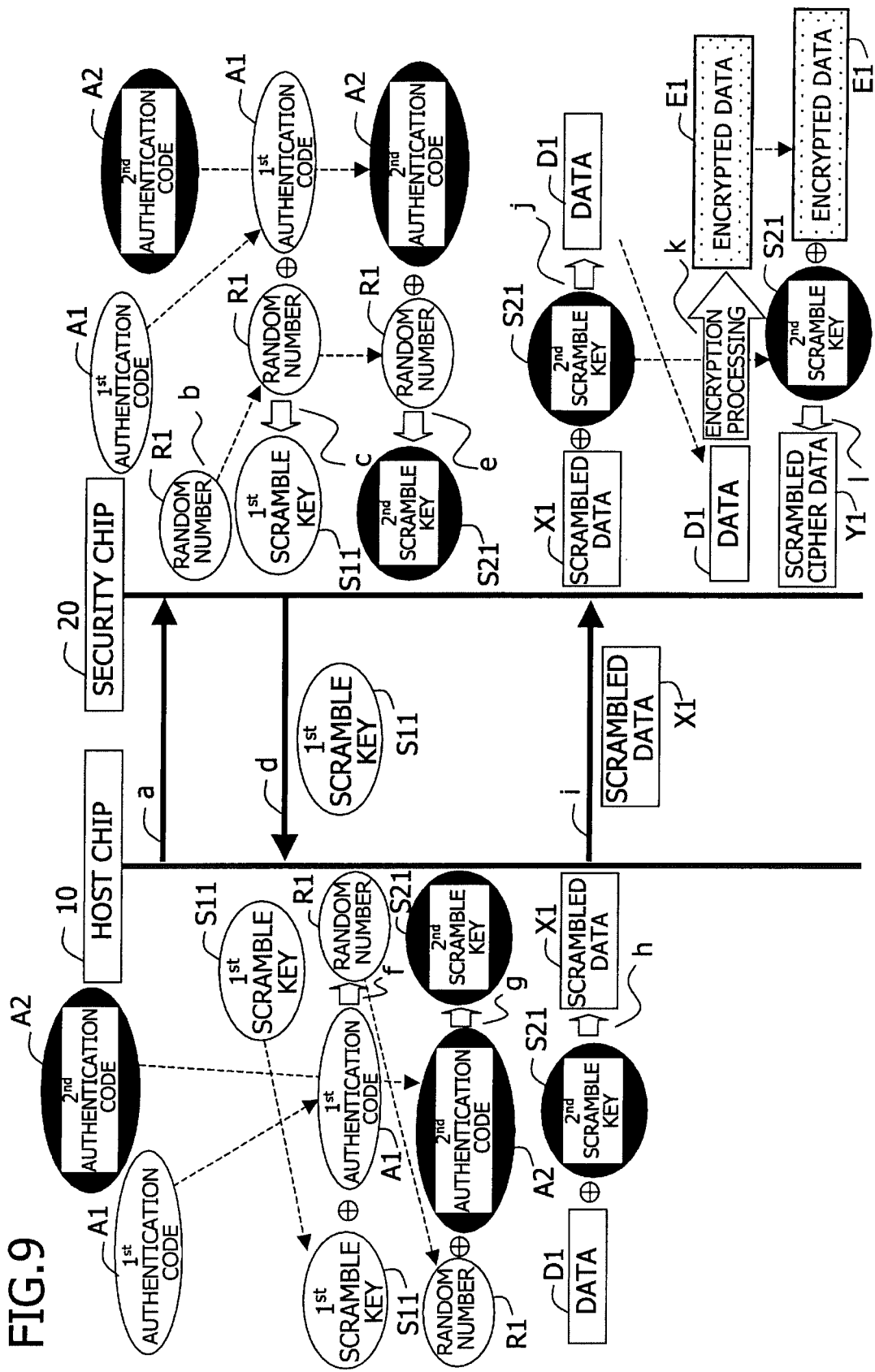
FIG. 9 is diagram depicting an example of processing between a host chip 10 and a security chip 20 according to the third embodiment.
Figure 10:
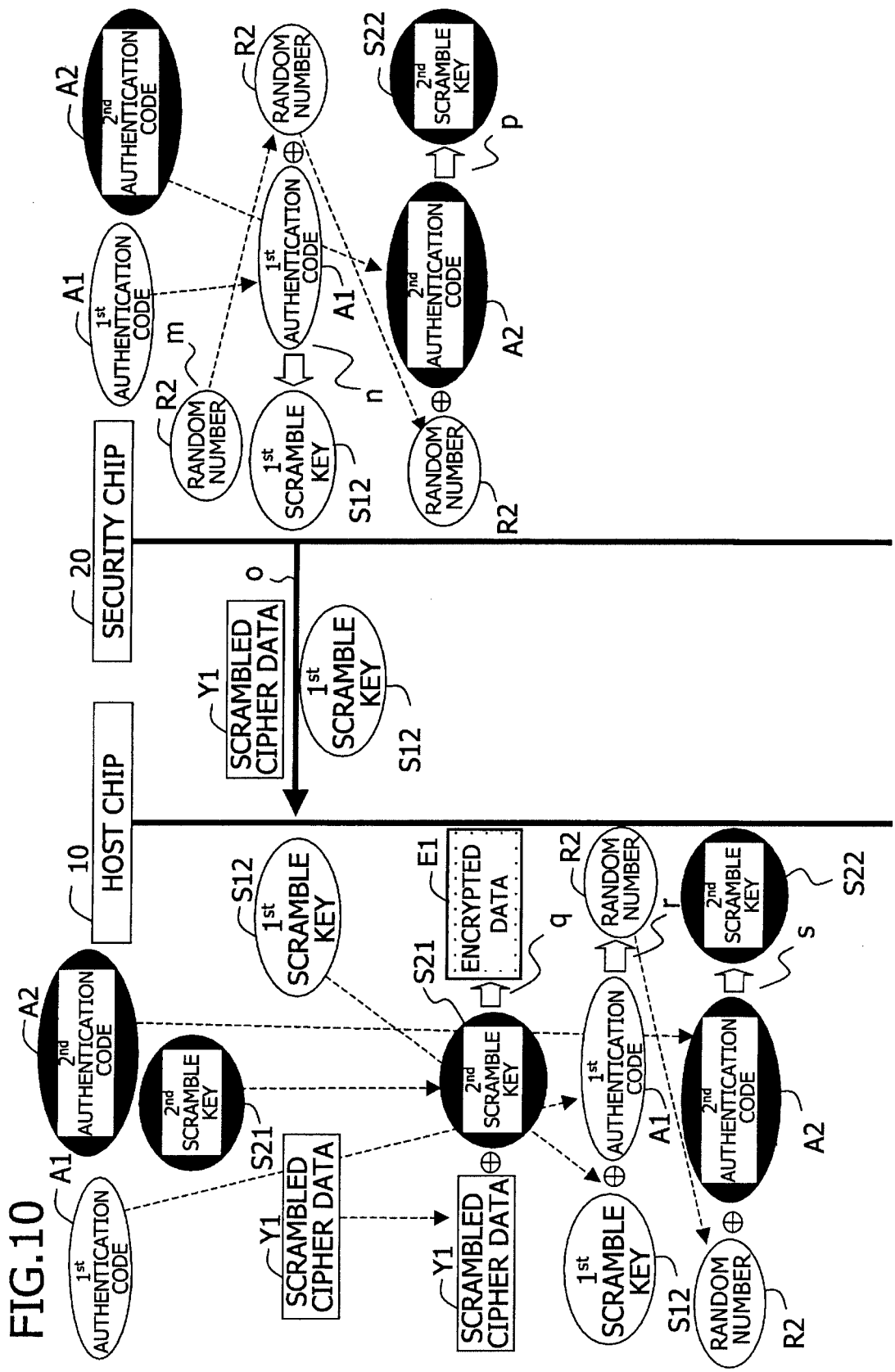
FIG. 10 is diagram depicting an example of processing between a host chip 10 and a security chip 20 according to the third embodiment.

FIG. 9 and FIG. 10 are diagrams depicting an example of processing between a host chip 10 and a security chip 20 according to the third embodiment. Just like FIG. 3 and FIG. 4 of the first embodiment, FIG. 9 and FIG. 10 depict scrambling of data in the case when unencrypted data is transmitted from the host chip 10 to the security chip 20. In this embodiment, the host chip 10 and the security chip 20 share a first authentication code A1 and a second authentication code A2 in advance.

In FIG. 9, when an initialization command is received (a), the security chip 20 generates a random number R1 (b). Then the security chip 20 generates a first scramble key S11 by performing the XOR operation on the random number R1 and the first authentication code A1 (c). Then the security chip 20 transmits the generated first scramble key S11, along with the result of the initialization processing, to the host chip 10 (d). The processing thus far is the same as the first and second embodiments.

Then the security chip 20 of this embodiment generates a second scramble key S21 by performing the XOR operation on the generated random number R1 and the second authentication code A2 (d). The host chip 10, on the other hand, obtains the random number R1 by performing the XOR operation on the first scramble key S11 according to the authentication code A1 which is held in advance (f), just like the first and second embodiments. Then the host chip 10 of this embodiment generates the second scramble key S21 by performing the XOR operation on the obtained random number R1 and the second authentication code A2 (g). Thereby the host chip 10 and the security chip 20 share not only the first and second authentication codes A1 and A2, but also the random number R1 and the second scramble key S21.

Then the host chip 10 of this embodiment generates scrambled data X1 by performing the XOR operation on encryption target data D1 and the second scramble key S21 (h), and transmits the scrambled data X1, along with an encryption instruction, to the security chip 20 (i). When the scrambled data X1 is received, the security chip 20 performs the XOR operation on the scrambled data X1 according to the generated second scramble key S21, and Obtains encryption target data D1 (j). Then the data D1 is encrypted by the encryption unit 24 of the security chip 20, and encrypted data E1 is generated (k). Then the security chip 20 generates scrambled cipher data Y1 by performing the XOR operation on the encrypted data E1 and the second scramble key S21 (l).

Then as FIG. 10 depicts, the security chip 20 generates a new random number R2 (m), and generates a new first scramble key S12 by performing the XOR operation on the random number R2 and the first authentication code A1 (n). Then the security chip 20 transmits the first scramble key S12, along with the scrambled cipher data Y1 generated in the processing l of FIG. 9, to the host chip 10 (o). Then the security chip 20 generates the second scramble key S22 by performing the XOR operation on the random number R2 and the second authentication code A2 (p).

The host chip 10, which received the scrambled cipher data Y1 and the first scramble key S12, obtains encrypted data E1 by performing the XOR operation on the scrambled cipher data Y1 according to the second scramble key S21, which is shared with the security chip 20 (q). The host chip 10 also obtains the random number R2 by performing the XOR operation on the received first scramble key S12 according to the first authentication code A1 (r). Thereby the host chip 10 obtains the encrypted data E1 corresponding to the encryption target data D1, and the host chip 10 and the security chip 20 share the random number R2.

If the next encryption target data D2 still exists, the host chip 10 generates a second scramble key S2 by performing the XOR operation on the random number R2 and the second authentication code A2 (s). Then the host chip 10 generates scrambled data X2 (not illustrated) by performing the XOR operation on the encryption target data D2 and the scramble key S22, and transmits the scrambled data X2 to the security chip 20 (not illustrated). The security chip 20 obtains the encryption target data D2 by performing the XOR operation on the received scrambled data X2 according to the second scramble key S22 generated in the processing p. Subsequent processing is the same as processing k to processing q in FIG. 9 and FIG. 10.

The example in FIG. 9 and FIG. 10 is a case of transmitting encryption target data from the host chip 10 to the security chip 20, but a case of transmitting decryption target data from the host chip 10 to the security chip 20 is also the same. In this case as well, a new random number generated by the security chip 20 is scrambled according to the authentication code A1, and is transmitted to the host chip 10, and the host chip 10 shares the new random number by restoring the random number according to the authentication code A1. The data decrypted by the security chip 20 is scrambled according to the second scramble key, which was obtained by scrambling the random number according to the second authentication code A2, and is transmitted to the host chip 10. The host chip 10 obtains the decrypted data by performing scramble operation on the scrambled data according to the second scramble key.

Thus to encrypt data, the security chip 20 according to this embodiment generates the first scramble key by performing the scramble operation on the random number generated by the random generation unit 23 and the first authentication code, and transmits the first scramble key to the host chip 10. The security chip 20 also generates the second scramble key by performing the scramble operation on the random number and the second authentication code. The security chip 20 receives, from the first chip 10, scramble data generated by performing the scramble operation on the encryption target data according to the second scramble key, which is generated by performing the scramble operation on the random number obtained from the first scramble key and the second authentication code. The security chip 20 obtains the encryption target data by performing the scramble operation on the scramble data and the second scramble key, generates the encrypted data by encrypting the encryption target data using the encryption unit 24, and transmits the encrypted data to the host chip 10.

To decrypt data, on the other hand, the security chip 20 according to this embodiment generates the first scramble key by performing the scramble operation on the random number generated by the random number generation unit 23 and the first authentication code, and transmits the first scramble key to the host chip 10. The security chip 20 also generates the second scramble key by performing the scramble operation on the random number and the second authentication code. The security chip 20 generates decrypted data by decrypting the encrypted data using the encryption unit, generates the scramble data by performing the scramble operation on the decrypted data and the second scramble key, and transmits the scramble data to the host chip 10. Then the security chip 20 obtains the decrypted data from the scramble data by causing the processor 11 of the host chip 10 to perform the scramble operation on scramble data according to the second scramble key, which is generated by performing the scramble operation on the random number obtained from the first scramble key and the second authentication code.

In the host chip 10, a random number is obtained by performing the scramble operation on the first scramble key according to the first authentication code.

Thus the security chip 20 according to this embodiment can prevent leakage of data by scrambling the data exchanged with the host chip 10 before transmission/reception, without the host chip 10 requiring an encryption unit 24. Since the security chip 20 does not use advanced encryption processing for scrambling the data, load on the system can be suppressed, and a drop in communication speed due to scrambling can be prevented.

Data is scrambled according to the second scramble key generated by scrambling the random number, which is shared between the host chip 10 and the security chip 20, according to the second authentication code. Therefore a third party cannot restore the scrambled data unless the second authentication code is known in addition to the random number. In other words, even if the random number is restored, the third party who does not know the second authentication code cannot restore the scrambled data. This makes it more difficult for a third party to restore the scrambled data. Thus the security chip 20 according to this embodiment can prevent data leakage between the host chip 10 and the security chip 20 more effectively.

According to the security chip 20 of this embodiment, it is sufficient if only the security chip 20 has the random number generation unit 23 for generating a random number, and the host chip 10 need not have the random number generation unit 23. Therefore data between the host chip 10 and the security chip 20 can be scrambled, and data leakage can be prevented only if the security chip 20 of this embodiment is mounted on the circuit board of the conventional system having the host chip 10.

Furthermore a random number to be the source of the second scramble key, which is used for scrambling data, is changed every time a predetermined number of transmission/reception sessions is performed. Hence the security chip 20 of this embodiment makes it difficult for scramble data to be continuously analyzed so that the data leakage range can be minimized.

As described above, the security chip 20 of this embodiment has two authentication codes, and scrambles data according to the scramble key based on the random number, which is shared using the first authentication code, and the second authentication code. Therefore the security chip 20 of this embodiment can implement data scrambling at high security, without making any change in the hardware of the host chip 10, while suppressing the load on the entire system. As a result, the security chip 20 can prevent leakage of data more effectively.

According to this embodiment, the first scramble key is generated by performing the scramble operation on the random number to be shared, according to the first authentication code. However the first scramble key may be generated by performing the scramble operation on the random number to be shared based on the random number of the previous transmission/reception session, instead of the first authentication code.

In this case, in each of the second or later transmission/reception sessions, the security chip 20 generates the first scramble key by performing the scramble operation on the random number of the current transmission/reception session and the random number of the previous transmission/reception session, and the host chip 10 obtains the random number of the current transmission/reception session by performing the scramble operation on the first scramble key according to the random number of the previous transmission/reception session. Therefore even if a third party detects the first authentication code, the third party who does not know the random number of the previous transmission/reception session, cannot restore the random number of the current transmission/reception session from the first scramble key.

Scrambling of data between the host chip 10 and the security chip 20 was described above. Scrambling of data according to this embodiment, however, is not limited to scrambling of data between the host chip 10 and the security chip 20, but can also be applied to scrambling of data in communication between two other parties (e.g. server and client).

All examples and conditional language recited herein are intended for pedagogical purposes to aid the reader in understanding the embodiments and the concepts contributed by the inventor to furthering the art, and are to be construed as being without limitation to such specifically recited examples and conditions, nor does the organization of such examples in the specification relate to a showing of the superiority and inferiority of the embodiments. Although the embodiments have been described in detail, it should be understood that the various changes, substitutions, and alterations could be made hereto without departing from the spirit and scope of the invention.

The invention claimed is:

1. A security device connected to a host device which includes a processor performing a first scramble operation and a first storage unit in which a first authentication code is stored, the security device comprising:
a second storage unit in which the first authentication code is stored;
a random number generator which generates a random number;
an encryptor which encrypts or decrypts an encryption target data; and
a controller which performs a second scramble operation, wherein
the controller generates a first scramble key by performing the second scramble operation on the random number generated by the random number generator and the first authentication code stored in the second storage unit, and transmits the first scramble key to the host device, and
the controller receives a scrambled data from the host device,
wherein the host device
generates the random number by performing the first scramble operation on the first authentication code and the first scramble key and
generates the scrambled data by performing the first scramble operation on the encryption target data and the random number being generated by the host device,
wherein the controller further:
generates the encryption target data by performing the second scramble operation on the scrambled data and the random number,
generates an encryption data by encrypting the encryption target data by the encryptor,
generates a scrambled encryption data by performing the second scramble operation on the random number and the encryption data, and
transmits the scrambled encryption data to the host device.

2. The security device according to claim 1, wherein
the random number is changed in each transmission/reception session of the scramble data, and
in each of the second or later transmission/reception sessions,
the controller generates the first scramble key by performing the second scramble operation on the random number of the current transmission/reception session and the random number of the previous transmission/reception session, and
the host device, using the processor, obtains the random number of the current transmission/reception session from the first scramble key, by performing the first scramble operation in use of the random number of the previous transmission/reception session.

3. The security device according to claim 1, wherein
the random number is changed in each transmission/reception session of the scramble data, and
in each of the second or later transmission/reception sessions,
the controller generates the first scramble key by performing the second scramble operation on the random number of the current transmission/reception session and the first authentication code, and
the host device, using the processor, obtains the random number of the current transmission/reception session from the first scramble key, by performing the first scramble operation in use of the first authentication code.

4. The security device according to claim 1, wherein
the first scramble operation and the second scramble operation include exclusive OR operation.

5. A security device connected to a host device which includes a processor performing a first scramble operation and a first storage unit in which a first authentication code and a second authentication code are stored, the security device comprising:
a second storage unit in which the first authentication code and the second authentication code are stored;
a random number generator which generates a random number;
an encryptor which encrypts or decrypts an encryption target data; and
a controller which performs a second scramble operation, wherein the controller generates a first scramble key by performing the second scramble operation on the random number generated by the random number generator and the first authentication code stored in the second storage unit, and transmits the first scramble key to the host device, and generates a second scramble key by performing the second scramble operation on the random number and the second authentication code, and the controller receives a scrambled data from the host device, wherein the host device generates the random number by performing the first scramble operation on the first authentication code and the first scramble key, generates a second scramble key by performing the first scramble operation on the random number being generated by the host device and the second authentication code, and generates the scrambled data by performing the first scramble operation on the encryption target data and the second scramble key, wherein the controller further:

generates the encryption target data by performing the second scramble operation on the scrambled data and the second scramble key, generates an encryption data by encrypting the encryption target data by the encryptor, generates a scrambled encryption data by performing the second scramble operation on the second scramble key and the encryption data, and transmits the scrambled encryption data to the host device.

6. The security device according to claim 5, wherein the random number is changed in each transmission/reception session of the scramble data, and in each of the second or later transmission/reception sessions, the controller generates the first scramble key by performing the second scramble operation on the random number of the current transmission/reception session and the random number of the previous transmission/reception session, and the host device, using the processor, obtains the random number of the current transmission/reception session from the first scramble key, by performing the first scramble operation in use of the random number of the previous transmission/reception session.

7. The security device according to claim 5, wherein the random number is changed in each transmission/reception session of the scramble data, and in each of the second or later transmission/reception sessions, the controller generates the first scramble key by performing the second scramble operation on the random number of the current transmission/reception session and the first authentication code, and the host device, using the processor, obtains the random number of the current transmission/reception session from the first scramble key, by performing the first scramble operation in use of the first authentication code.

8. The security device according to claim 5, wherein the first scramble operation and the second scramble operation include exclusive OR operation.

9. A security system comprising:

a host device including, a processor performing a first scramble operation; and a first storage unit in which a first authentication code is stored; and a security device including, a second storage unit in which the first authentication code is stored;

a random number generator which generates a random number;

an encryptor which encrypts or decrypts an encryption target data; and a controller which performs a second scramble operation;

wherein the controller of the security device generates a first scramble key by performing the second scramble operation on the random number generated by the random number generator and the first authentication code stored in the second storage unit, and transmits the first scramble key to the host device, the processor of host device generates the random number by performing the first scramble operation on the first authentication code and the first scramble key and generates the scrambled data by performing the first scramble operation on the encryption target data and the random number being generated by the host device, the controller of the security device receives the scrambled data from the host device, generates the encryption target data by performing the second scramble operation on the scrambled data and the random number, generates an encryption data by encrypting the encryption target data by the encryptor, generates a scrambled encryption data by performing the second scramble operation on the random number and the encryption data, and transmits the scrambled encryption data to the host device.

10. A security system comprising:

a host device including, a processor performing a first scramble operation; and a first storage unit in which a first authentication code the second authentication code are stored; and a security device including, a second storage unit in which the first authentication code the second authentication code are stored;

a random number generator which generates a random number;

an encryptor which encrypts or decrypts an encryption target data; and a controller which performs a second scramble operation;

wherein the controller of the security device generates a first scramble key by performing the second scramble operation on the random number generated by the random number generator and the first authentication code stored in the second storage unit, and transmits the first scramble key to the host device, and generates a second scramble key by performing the second scramble operation on the random number and the second authentication code, the processor of host device generates the random number by performing the first scramble operation on the first authentication code and the first scramble key, generates a second scramble key by performing the first scramble operation on the random number being generated by the host device and the second authentication code, and generates the scrambled data by performing the first scramble operation on the encryption target data and the second scramble key, the controller of the security device receives the scrambled data from the host device, generates the encryption target data by performing the second scramble operation on the scrambled data and the second scramble key, generates an encryption data by encrypting the encryption target data by the encryptor, generates a scrambled encryption data by performing the second scramble operation on the second scramble key and the encryption data, and transmits the scrambled encryption data to the host device.

* * * * *